US006408962B1

(12) United States Patent
Ryckman

(10) Patent No.: US 6,408,962 B1
(45) Date of Patent: Jun. 25, 2002

(54) CONVERTIBLE SLED FOR TRANSPORTING LARGE GAME

(76) Inventor: Jason Ryckman, N85 W15041 MacArthur Dr., Menomonee Falls, WI (US) 53051

( * ) Notice: Subject to any disclaimer, the term of this patent is extended or adjusted under 35 U.S.C. 154(b) by 0 days.

(21) Appl. No.: 09/556,846

(22) Filed: Apr. 21, 2000

(51) Int. Cl.$^7$ .......................... B62B 13/18; B62D 55/04
(52) U.S. Cl. ........................ 180/9.22; 180/9.3; 280/9
(58) Field of Search ................... 180/9.22, 9.3, 180/9.34, 9.64, 180, 182; 280/28.12, 28.13, 28.17, 28.18, 19, 7.1, 7.12, 9–10, 7.14

(56) References Cited

U.S. PATENT DOCUMENTS

| | | | | |
|---|---|---|---|---|
| 2,625,229 A | * | 1/1953 | Voorhees ....................... | 180/1 |
| 3,568,787 A | | 3/1971 | Gremeret | |
| 3,730,542 A | * | 5/1973 | Chadwick ....................... | 280/9 |
| 3,874,683 A | * | 4/1975 | Lawson ......................... | 280/10 |
| 3,912,290 A | * | 10/1975 | Rich ............................ | 280/9 |
| 4,747,457 A | | 5/1988 | Buscaiolo et al. | |
| 5,439,237 A | * | 8/1995 | Kutchie ........................ | 280/11 |
| 5,636,504 A | * | 6/1997 | Kaley et al. ................... | 56/1 |

* cited by examiner

*Primary Examiner*—Anne Marie Boehler
*Assistant Examiner*—Tony Winner
(74) *Attorney, Agent, or Firm*—Joseph S. Heino

(57) ABSTRACT

A convertible sled can be dragged silently into the woods by the hunter. Once the hunter has bagged his game, he converts the sled into a track-driven and battery-powered cart. The sled portion is at the bottommost part of the assembly on the way into the woods. In this "sledding" mode, the battery pack, the tracks and the frame are situated above the sled. In the "carting" or "track-driving" mode, the sled is detached from the assembly and is remounted above the frame, tracks and battery pack. In this mode, the sled forms a platform upon which the game can be secured. In the carting mode, the hunter activates the track-driven cart to assist with extraction of the game. Activation of the track-driven cart is by means of a handle which extends to the front of the assembly. An alternative embodiment includes a pair of removable wheels mounted to a pair of adjustable wheel supports, which wheels may be used to roll the convertible sled as well.

11 Claims, 4 Drawing Sheets

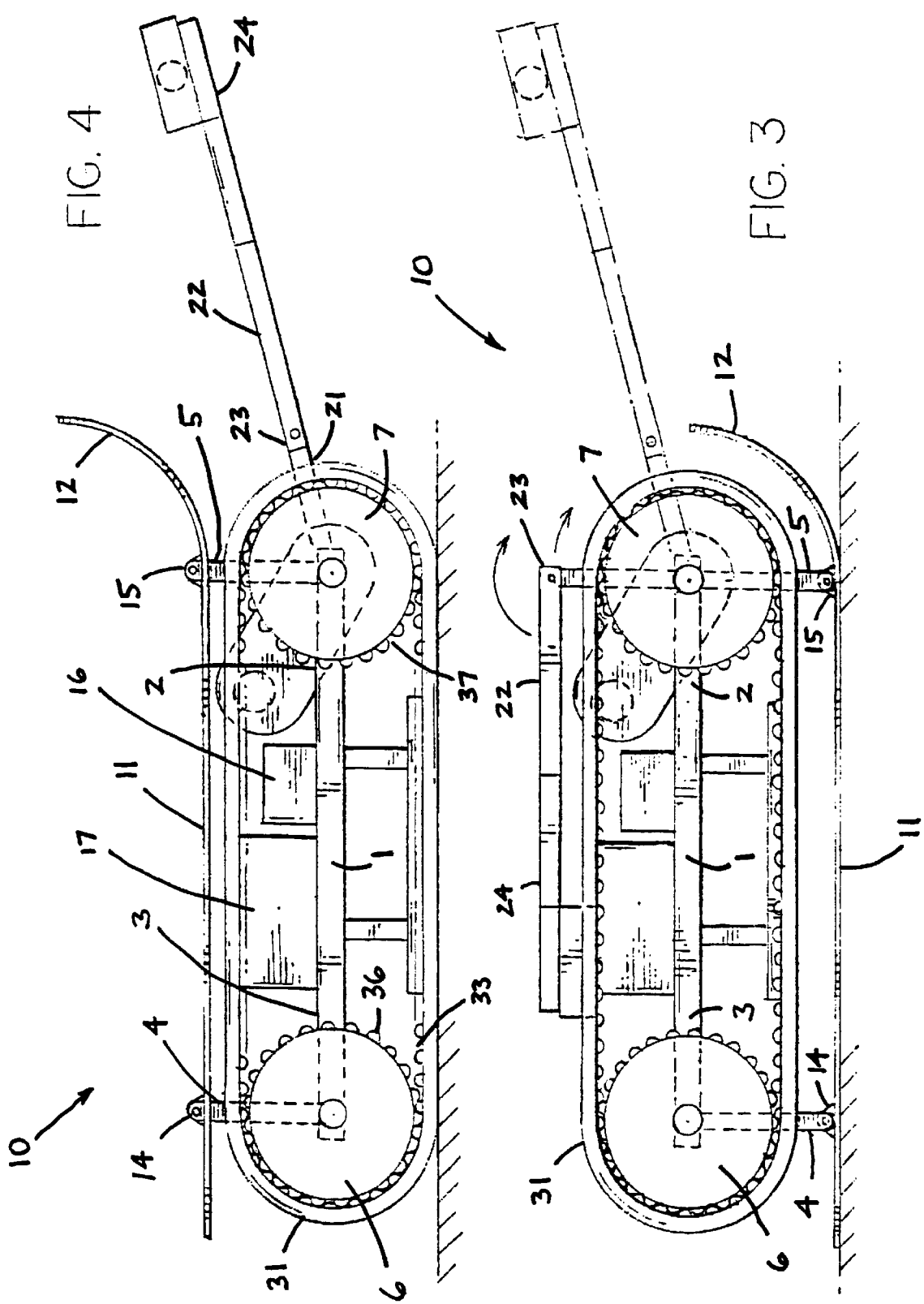

CONVERTIBLE SLED FOR TRANSPORTING LARGE GAME

FIELD OF THE INVENTION

The present invention relates to powered and unpowered devices for transporting objects. More particularly, this invention relates to an apparatus which can be utilized in a powered or in an unpowered mode for transporting the carcass of a large game animal from a hunting area to another area by means of a sled assembly which is convertible to an electrically actuable track driven cart.

BACKGROUND OF THE INVENTION

The sport of hunting large wild game is filled with the experiences of the great outdoors and the exhilaration of the hunt. The sport of hunting large wild game also requires a great amount of effort, perseverance and endurance on the part of the hunter. The hunter must expend great energy getting to the area in which he or she will stalk the game. Once the game is bagged, an even greater amount of energy is typically expended in the effort to extract the large dead animal from the hunting site. In the experience of this inventor, this activity requires sheer strength by the hunter and may be the most physically challenging portion of the hunt.

SUMMARY OF THE INVENTION

It is, therefore, a principal object of this invention to provide a new, useful, and uncomplicated device for extracting a large game animal from a hunting site quickly, efficiently and with as little effort as possible by the hunter. It is a further object of this invention to provide such a device which requires only a minimal number of elements and which is easily usable in the field. It is yet another object of this invention to provide such a device which can be manually delivered to the hunting site in an unpowered, or "power off," mode which minimizes noise in the surrounding area, but which can then be activated to a powered, or "power on," mode to convert the device to an electrically actuated extraction mechanism.

The present invention has obtained these objects. It provides for a convertible wheeled sled which can be dragged or rolled silently into the woods by the hunter. Once the hunter has bagged his game, he converts the wheeled sled into a track-driven and battery-powered cart. The sled portion is at the bottommost part of the assembly on the way into the woods. In this "sledding" mode, the battery pack, the tracks and the frame are situated above the sled. In the "carting" or "track-driving" mode, the sled is detached from the assembly and is remounted above the frame, tracks and battery pack. In this mode, the sled forms a platform upon which the game can be secured. In the carting mode, the hunter activates the track-driven cart to assist with extraction of the game. Activation of the track-driven cart is by means of a handle which extends to the front of the assembly much like a hand operated lift truck. The foregoing and other features of the device of the present invention will be further apparent from the detailed description which follows.

DETAILED DESCRIPTION OF THE DRAWINGS

FIG. 3 is a left side elevational view of the sled shown in FIG. 1 but showing the device configured in the sledding mode.

FIG. 4 is a left side elevational view of the sled shown in FIG. 1 and again showing the device configured in the track-driving mode.

DETAILED DESCRIPTION

Figure 1:
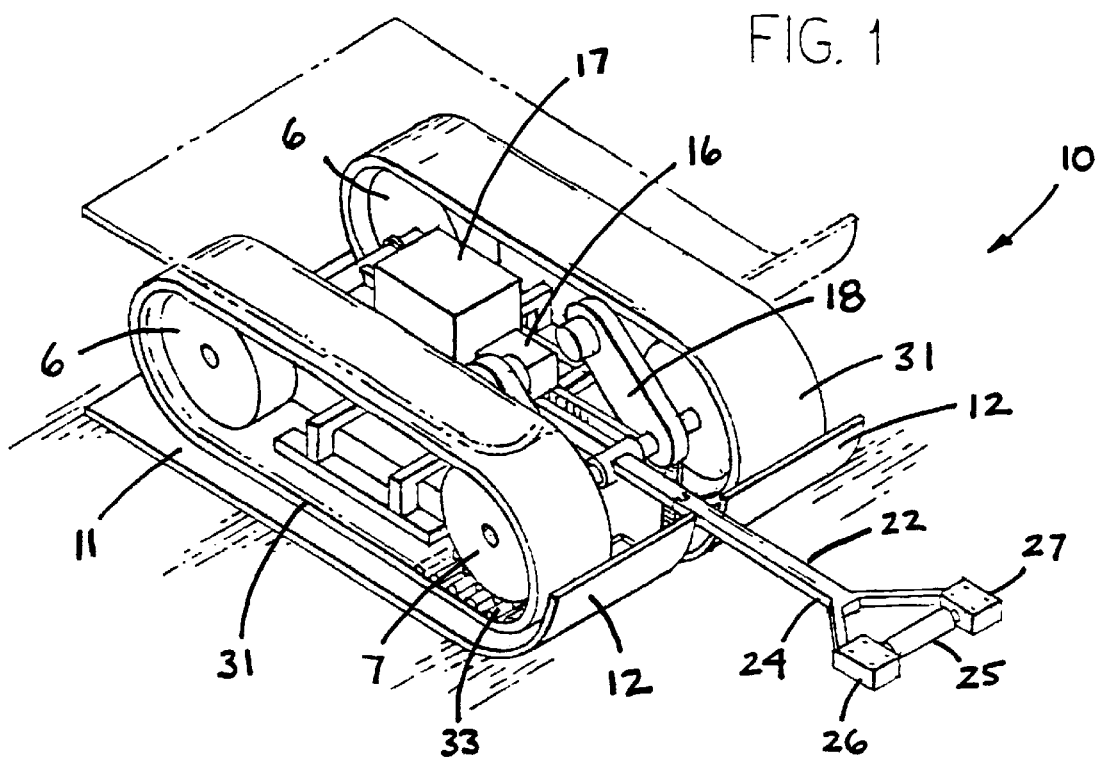
FIG. 1 is a front and left side perspective view of the convertible sled constructed in accordance with the present invention.
Figure 2:
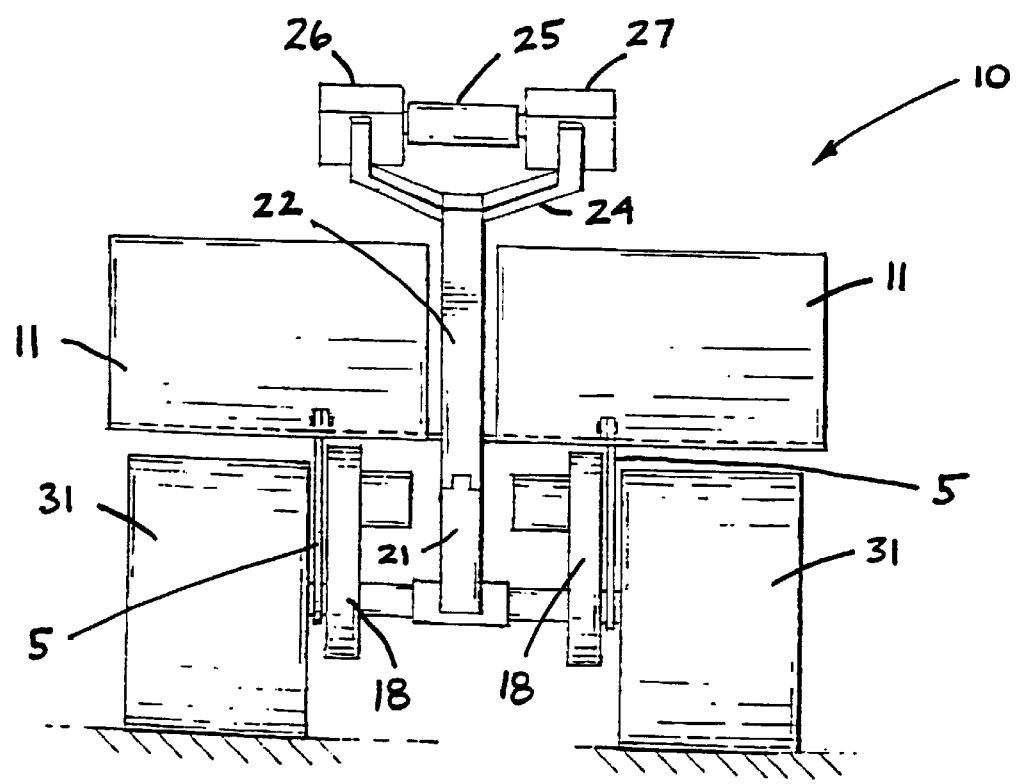
FIG. 2 is a front elevational view of the convertible sled shown in FIG. 1 and showing the device configured in the track-driving mode.
Figure 5:
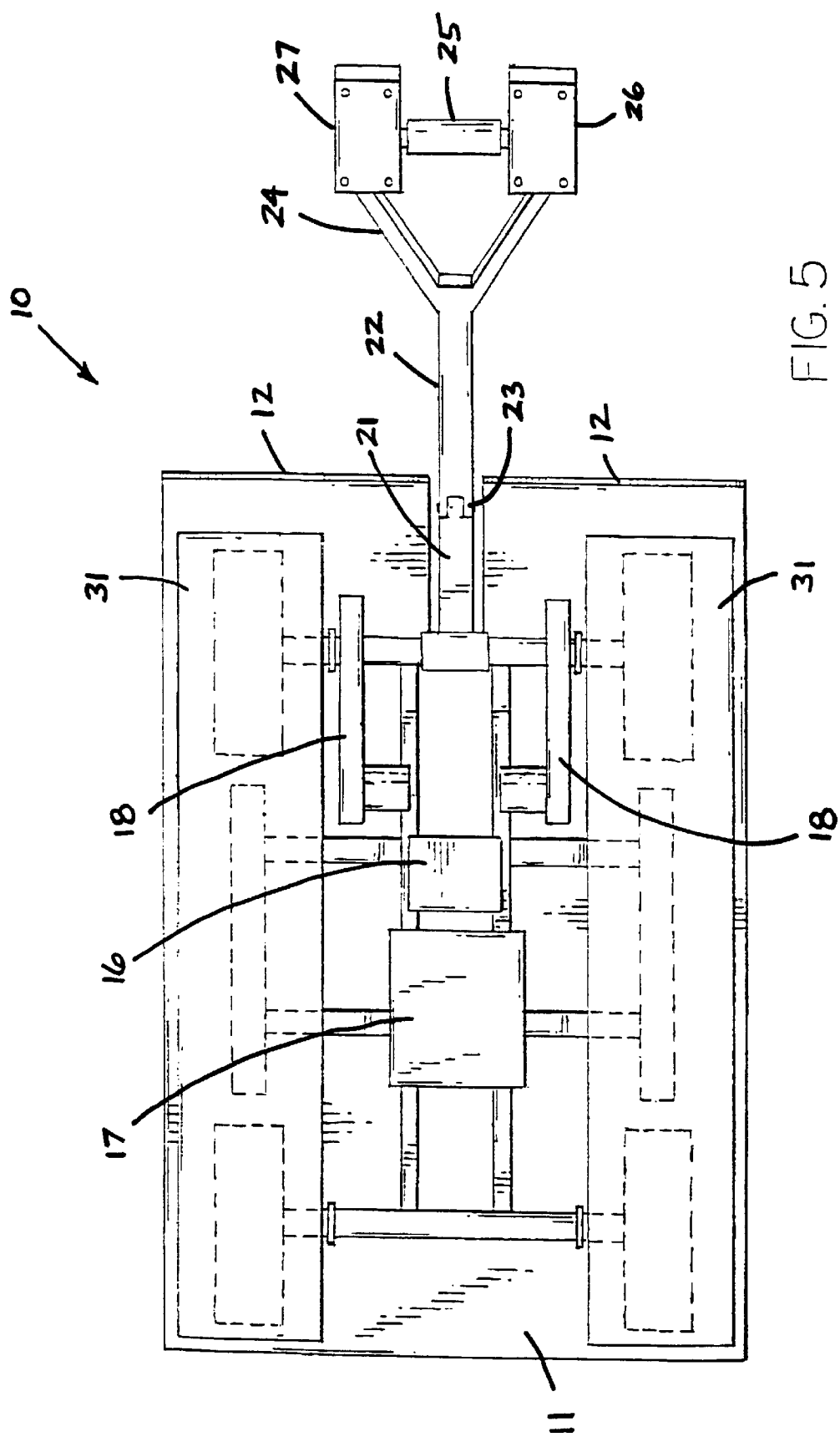
FIG. 5 is a top plan view of the sled configured in its sledding mode, as shown in FIG. 3.

Referring to the drawings in detail FIG. 1 illustrates a convertible sled assembly constructed in accordance with the present invention and generally identified 10. Specifically referring to FIGS. 3 and 4, it will be seen that the convertible sled assembly 10 includes a central frame 1. This central frame 1 includes a forward portion 2 and a rearward portion 3. The forward portion 2 of the frame 1 supports a pair of front track drive idler rollers 7. Similarly, the rearward portion 3 of the frame 1 supports a pair of rear track drive idler rollers 6. Each pair of rollers 6, 7 to either side of the central frame 1 carries a continuous track 31 about their outer circumference. Integrally formed into the rear track drive idler rollers 6 are a plurality of meshing teeth 36. Integrally formed into the front track drive idler rollers 7 are a plurality of meshing teeth 37. These idler roller teeth 36, 37 are functionally adapted to mesh with the meshing teeth 33 situated along the inner surface of the continuous track 31.

In the preferred embodiment, each continuous track 31 is movable by virtue of a gear motor 18 which drives the front track drive idler roller 7. The gear motor 18 is controlled by means of a control circuit 16 and powered by means of a battery pack 17, both of which are situated along the central frame 1 of the assembly 10. Forwardly of the assembly 10 is a foldable handle 24. The handle 24 includes a proximal handle portion 21 and a distal handle portion 22. Separating the proximal and distal handle portions 21, 22 is a handle joint 23. The handle also includes a twist throttle 25, speed control mechanism 26 and direction control mechanism 27. It is to be understood that any number of control configurations could be utilized in the assembly 10 and still come within the scope of the present invention.

The forward portion 2 of the central frame 1 is also functionally adapted to receive one end of a pair of sled support legs 5. Similarly, the rearward portion 3 of the central frame 1 is functionally adapted to receive one end of a second pair of sled support legs 4. These sled support members 4, 5 are fixable into opposing vertical positions. The first is a generally downwardly extending direction as shown in FIG. 3. In this downwardly extending direction, a sled body 11 is affixed to the sled support members 4, 5 at the sled flanges 14, 15, respectively. The means used to affix the sled body 11 to the flanges 14, 15 could be a removable pin or other suitable retention mechanism. Whichever mechanism is used, it must be quickly and easily removable from the assembly 10. In this "sledding" mode, the assembly 10 effectively works to hold the central frame 1 and tracks 31 off of the ground and fully supported by the sled body 11. In opposite fashion, the sled support members 4, 5 are rotatable 180° from their downward position to an upwardly extending position. In this "track driving" mode, the sled body 11 is fixable above the central frame 1 and the tracks 31 are directly engageable with the ground. The forward portion of the sled body 11 also includes a ramped forward portion 12 the purpose of which is to facilitate the negotiation of objects over which the assembly 10 must be pulled when in the "sledding" mode.

Figure 6:
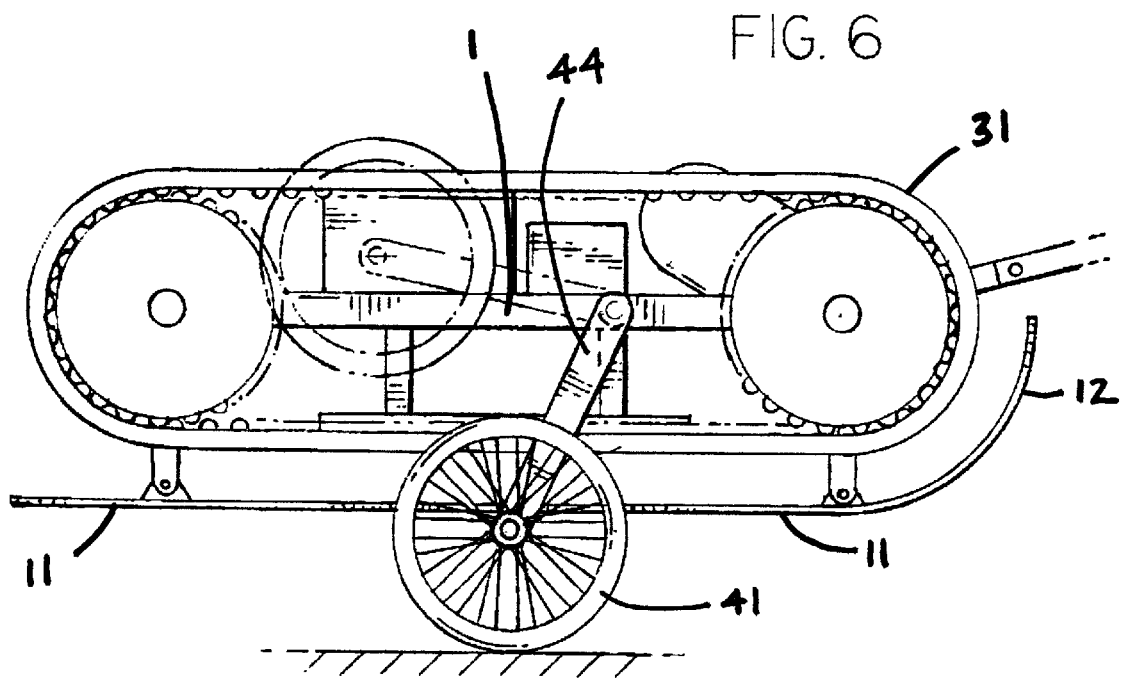
FIG. 6 is a left side elevational view of an alternative embodiment of the sled shown in FIG. 1 as constructed with removable wheels and wheel supports.
Figure 7:
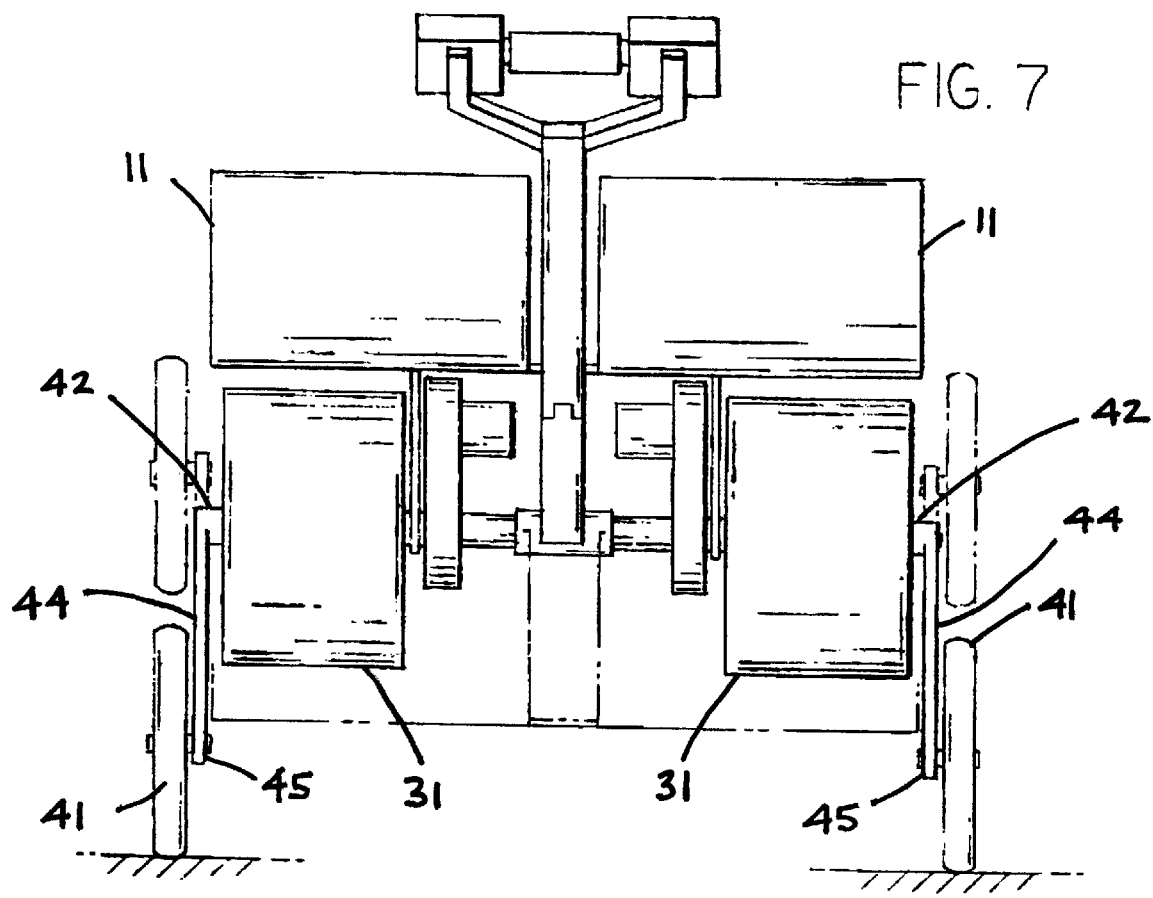
FIG. 7 is a front elevational view of the alternative embodiment shown in FIG. 6.

In an alternative embodiment, the central frame 1 includes a pair of outwardly extending and rotatable wheel supports 42. Each wheel support 42 has attached to it a wheel support arm 44 which is rotatable about the axis of the wheel support 42. A wheel 41 is attached to the distal end 45 of the support arm 44. See FIGS. 6 and 7. In this embodiment, the vertical position of the wheels 41 may be adjusted such that the assembly 10 is movable as a pull-type cart. In the experience of this inventor, this wheeled alternative embodiment is quite useful when transporting the assembly into the woods during those times when there is little or no snowfall over which the sled body 11 can be pulled.

In application, the hunter or user would unload the assembly 10 from his or her vehicle most likely already configured in the "sledding" mode. The hunter would then grasp the handle 24 of the assembly 10 and pull it silently through the woods with the sled body 11 affixed to the bottommost portion of the assembly 10. In the alternative embodiment, and in the situation where there is little or no snowfall over which the assembly 10 may be pulled, the user could simply attach the wheels 41 to the wheel support arms 44 and roll the assembly 10 into the woods. Once in position, the assembly 10 would simply remain in the immediate area for later use. Once the large game is bagged, the assembly 10 is then converted to its "track driving" mode. This is accomplished by first releasing the retention mechanisms holding the sled body support members 4, 5 to the sled body 11. The sled body 11 is then removed and set off to the side. The sled body support members 4, 5 are then rotated 180° to place them in a generally upwardly facing direction. Though not shown in great detail, it is to be understood that the ends of each of the sled body support members 4, 5 are releasably fixable at 90° angles, upwardly and downwardly, relative to the central frame 1. This allows for a "four point" stability of the sled body 11 when it is placed atop the assembly 10. The sled body 11 is then relocated atop the assembly 10 and the retention mechanisms are replaced. The game carcass is then secured to the sled body 11 and the assembly 10 is activated. The hunter controls the forward movement by means of the twist throttle 25, the speed control device 26 and the direction control device 27 situated atop the handle. While the assembly 10 is, for all intents and purposes, silent in its movement towards the hunting site, the same is not true of the assembly 10 when it is extracting the game from the hunting site. At this stage of the hunt, noise is of no major concern to this particular hunter. It should also be mentioned that, in the experience of this inventor, the assembly 10 of the present invention could have many other outdoor uses such as an aid to those who enjoy ice fishing or even as a device for hauling small bundles of firewood.

From the foregoing detailed description of the illustrative embodiment of the invention set forth herein, it will be apparent that there has been provided a new, useful and uncomplicated device for extracting a large game animal from a hunting site quickly, efficiently and with as little effort as possible by the hunter; which requires only a minimal number of elements and which is easily usable in the field; which can be manually delivered to the hunting site in an unpowered, or "power off," mode which minimizes noise in the surrounding area, but which can then be activated to a powered, or "power on," mode to convert the device to an electrically actuated extraction mechanism.

The principles of this invention having been fully explained in connection with the foregoing, I hereby claim as my invention:

1. A device to assist a hunter in extracting the carcass of a large game animal from a hunting site which comprises
   a central frame,
   a collapsible means for pulling the central frame,
   a pair of front track idler rollers situated to either side of the central frame,
   a pair of rear track idler rollers situated to either side of the central frame,
   a pair of continuous tracks situated to either side of the central frame and supported by the front and rear track idler rollers,
   means for powering said continuous tracks,
   a plurality of sled body support members that are rotatable, each support member having a first end attached to the central frame and a second end, said first end being fixable both orthogonally upwardly and downwardly from the central frame,
   a detachable sled body fixable to the second ends of each of the plurality of sled body support members, said sled body positionable either above or below the central frame,
   a pair of rotatable wheel supports, each wheel support opposing the other and extending axially generally outwardly from the central frame,
   a pair of wheel support arms, each support arm being rotatable about the axis of one wheel support and each support arm having a first end that is proximal to one wheel support and also having a distal end, and
   a pair of wheels, one wheel being attached to the distal end of each wheel support arm,
   wherein each of said wheels, wheel supports and wheel support arms may be rotated upwardly so as not to contact the ground and downwardly so as to support the device while it is being pulled over the ground.

2. The device of claim 1 wherein said collapsible pulling means and said track powering means includes a sled control handle extending forwardly of said sled and further includes means for actuating said track from a power "on" condition to a power "off" condition.

3. The device of claim 2 wherein said sled body includes a forwardly extending ramped portion whereby the sled body can be negotiated over obstacles in the path of the device.

4. The device of claim 3 wherein said variable sled body mounting means includes a plurality of sled support members which extend downwardly from said main support body when the sled body is mounted immediately below said continuous tracks.

5. The device of claim 4 wherein said plurality of sled support members are moveable to an upwardly extending position in relation to said main support body when the sled body is mounted immediately above said continuous tracks.

6. The device of claim 5 wherein said sled support members are perpendicularly and removably attachable to said sled body when said sled body is located immediately above or immediately below said tracks.

7. A device to assist a hunter in extracting the carcass of a large game animal from a hunting site comprising
   a central frame, said central frame having an upturned leading portion, a means for pulling said central frame, a pair of front idler rollers situated on opposite sides of the central frame, a pair of rear idler rollers situated on opposite sides of the central frame, a pair of continuous tracks supported by the front and rear idler rollers, a track power supply, means for actuating said continuous track, a sled body with a forwardly extending ramped portion permitting the device to be negotiated over obstacles, a pair of wheels, a pair of wheel supports situated to either side of the main support frame with a first end attached to one of said wheels and a second end removably attached to said support frame, said wheel supports being permitted to rotate between a fixed downward position and a fixed upward position, means for variably and movably mounting said sled body immediately below said continuous tracks or immediately above said continuous tracks whereby the hunter may utilize the device by sledding the device to the hunting site and by powering the device away from the site, and means for adjusting the position of said wheel supports whereby said wheels may be used to roll said device to and from a hunting site.

8. The device of claim 7 wherein said variable sled body mounting means includes a plurality of sled support members which extend downwardly from said main support body when the sled body is mounted immediately below said continuous tracks.

9. The device of claim 8 wherein said plurality of sled support members are moveable to an upwardly extending position in relation to said main support body when the sled body is mounted immediately above said continuous tracks.

10. The device of claim 9 wherein said sled support members are perpendicularly and removably attachable to said sled body when said sled body is located immediately above or immediately below said continuous tracks.

11. The device of claim 10 wherein said track powering means includes track speed control means and further includes control means for advancing or reversing movement of said continuous tracks.

* * * * *